Aug. 17, 1965    R. R. HAGER    3,201,176
BRAKE BALANCING DEVICE FOR HYDRAULIC BRAKE SYSTEM
Original Filed Oct. 19, 1961    2 Sheets-Sheet 1

INVENTOR.
ROBERT R. HAGER
BY
ATTORNEY

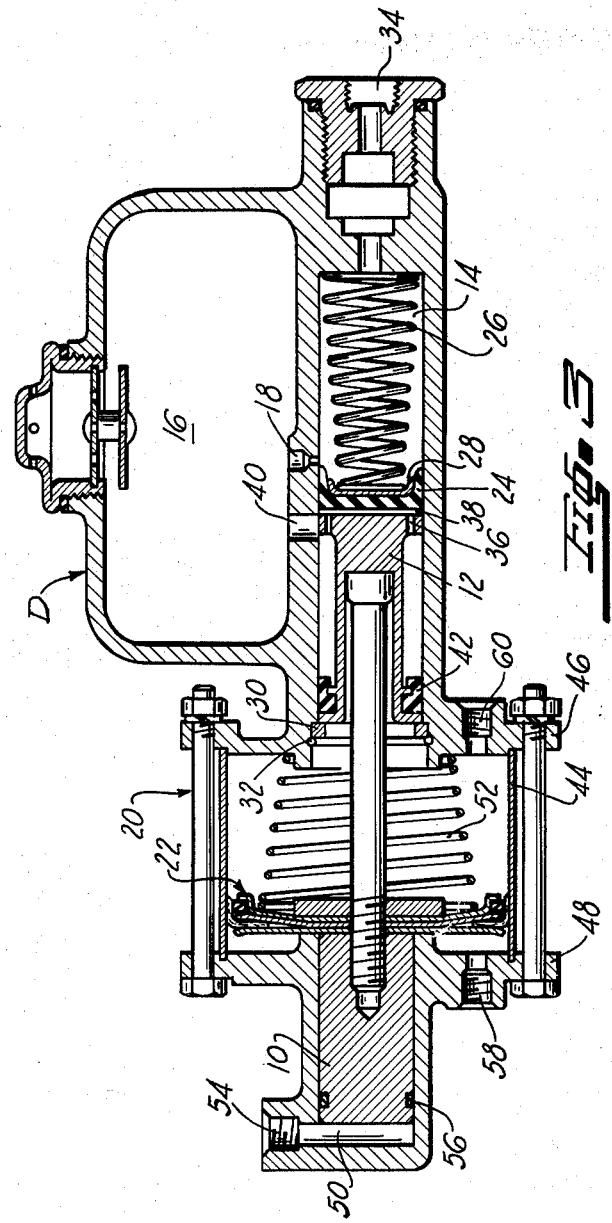

United States Patent Office 3,201,176
Patented Aug. 17, 1965

3,201,176
BRAKE BALANCING DEVICE FOR HYDRAULIC BRAKE SYSTEM
Robert R. Hager, South Bend, Ind., assignor to The Bendix Corporation, South Bend, Ind., a corporation of Delaware
Original application Oct. 19, 1961, Ser. No. 146,101. Divided and this application Mar. 4, 1963, Ser. No. 262,441
6 Claims. (Cl. 303—6)

This is a division of my parent application No. 146,-101 filed October 19, 1961. The present invention relates to automotive braking systems having provisions for producing different braking efforts on its front and rear wheels; and more particularly to pneumatic fluid pressure actuated braking systems which will apply different braking efforts to the front and rear wheels of the automobile.

The art has long known that a weight shift occurs during a deceleration of an automotive vehicle which shifts additional weight of the vehicle onto its front wheels to increase the braking effort which they can produce while decreasing the weight on rear wheels of the vehicle to decrease the braking effort which they can produce. It has also been known that the amount of braking effort which can be produced by either the front or rear wheels of the vehicle changes with the type of road surface over which the vehicle is traveling, and also changes with climatic conditions.

A further condition occurs in automotive vehicle braking structures which makes it difficult to proportion the braking effort between the front and rear wheel brakes to give the maximum braking effort at which the vehicle is capable under all conditions without sliding of any wheels. This condition arises by reason of the fact that the coefficient of friction of the brake lining varies with temperature, so that it does not remain constant from one stop to the next, or even during a single stop.

An object of the present invention is the provision of a new and improved braking system of the immediately above described type wherein a first pneumatic servomotor driven structure is operatively connected to a second pneumatic servomotor driven structure to increase the force applied to a vehicle's front brakes and/or "bucks" off the force which the first servomotor applies to the rear wheel brake structure.

The invention resides in certain constructions and combinations and arrangements of parts; and further objects and advantages of the present invention will become apparent to those skilled in the art to which it relates from the following description of several preferred embodiments described with reference to the accompanying drawings forming a part of the specification, and in which:

FIGURE 3 is an enlarged cross sectional view of one of the structures seen in FIGURES 1 and 2.

As the coefficient of friction between the vehicle's wheels and the road surface change very drastically with weather conditions and road surfaces etc., from an amount less than a coefficient of .1 to instances where it can approach 1.0 the amount of braking effort used to actuate both the front and rear wheel brakes will be ideally in proportion to the weight which exists on the wheels at any and all rates of deceleration. By so doing, the front and rear wheel brakes will be caused to slide at the same time regardless of the type of road surface over which the vehicle is traveling. In most instances it will be desirable to actuate the front brakes of the vehicle by means of a force which is substantially linear. It should be noted that with a coefficient of friction of 1.0 between the tires of the vehicle and the road surface the maximum rate of deceleration which can possibly be achieved is 32 ft./sec.$^2$.

Where the actuating force which is supplied to the rear wheel brakes is a linear function of deceleration the vehicle braking system can be designed for only one coefficient of friction of its brake lining and for only one road condition (both of which change drastically). Otherwise the rear wheel brakes will slide before the maximum weight of deceleration of which that vehicle is capable occurs. In such systems, therefore, the rear wheel brakes do not do as much of the braking at low rates of deceleration as they would otherwise be capable of. A slightly better compromise occurs by supplying the pressure to the rear wheel brakes in two stages. That is, the ratio of the pressure supplied to the rear wheel brakes as opposed to that supplied to the front wheel brakes starts off initially at one rate; and after a predetermined deceleration is reached, a second stage occurs wherein a smaller proportion of actuating force is supplied to the rear wheel brakes.

According to principles of the present invention the hydraulic output of one pneumatic servomotor driven fluid pressure producing device is split in two portions (one to the front brakes and one to the rear brakes) and a second pneumatic motor driven device is used to either intensify or "buck-off" the pressure in one of the portions.

Figure 1:
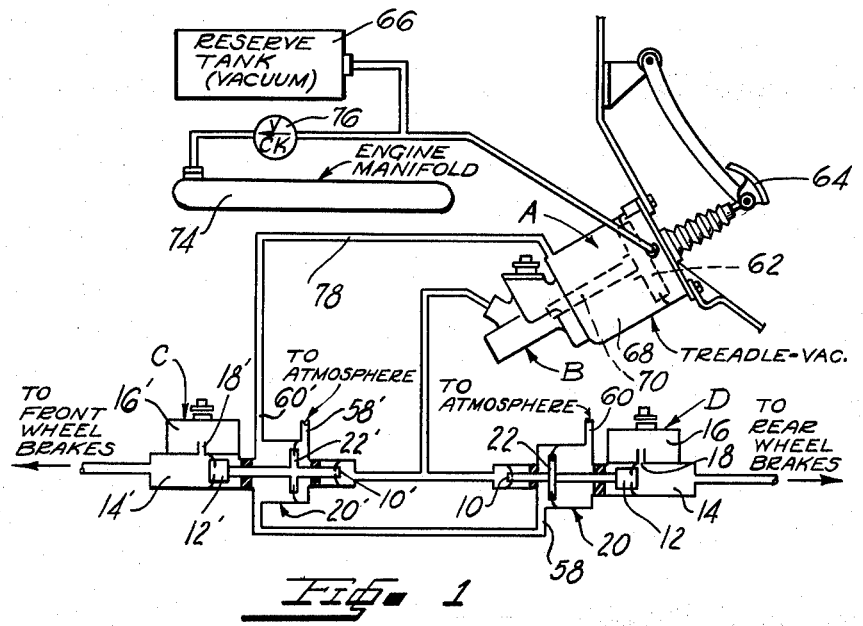
FIGURE 1 is a schematic view of an automotive braking system embodying principles of the present invention.

The braking system shown in FIGURE 1 generally comprises an atmospheric suspended vacuum powered servomotor A which is used to displace hydraulic fluid from a master cylinder B to a pair of hydraulic pressure modifying units C and R respectively. In the embodiment shown in FIGURE 1, the hydraulic pressure modifying unit C is used to increase the hydraulic pressure received from the master cylinder B and transmit the same to the front wheel brakes of the vehicle; and the hydraulic pressure modifying unit D is used to receive the same fluid pressure from the master cylinder B and decrease the pressure thereof before transmitting it to the rear wheel brakes of the automotive vehicle. The use of both of the hydraulic pressure modifying units C and D will not be required in all instances; and although the units are similarly constructed, they may be proportioned somewhat differently to produce different degrees of pressure modification. Inasmuch as the units C and D are similar, only the unit D will be described in detail. Corresponding portions of the unit C will be designated by like reference numeral characterized further in that a prime mark is affixed thereto.

The unit D generally comprises a hydraulic input piston 10 that is mechanically and directly connected to an output piston 12 which displaces fluid from a cylinder bore 14 to the rear wheel brakes of the automotive vehicle. The hydraulic cylinder 14 is provided with the usual low pressure reservoir 16 of compensating fluid which is communicated with the hydraulic cylinder 14 through a compensating port 18 when the piston 12 is in its normal retracted position in order that the rear wheel brakes will at all times be kept full of hydraulic fluid. The pressure modifying unit D further includes an atmospheric suspended air motor 20 positioned between the input piston 10 and the output piston 12 to act directly and mechanically upon these pistons, and change or modify the force which is delivered to the output piston 12. For a more complete understanding of the construction and operation of the pressure modifying unit D reference may now be had to FIGURE 3 of the drawings.

The output hydraulic cylinder chamber 14 shown in FIGURE 3 is formed by means of a conventional master cylinder. The output piston 12 of the master cylinder is provided with the usual cup-shaped packing 24 which is held against the inner end of the piston 12 by means of a spring 26 that is wedged between the end of the bore 14 and a seal retainer 28 positioned against the cup seal 24. The spring 26 normally holds the piston 12 in a retracted position against a return stop 30 which is held in the outer end of the bore 14 by means of a snap ring 32. A compensating port 18 is located forwardly of the retracted position of the lips of the cup packing 24. As the piston 12 is moved forwardly, therefore, the lips of the seal 24 slip over the compensating port 18 to close off communication with the low pressure reservoir 16; and thereafter fluid is forced out of the chamber 14 and through the outlet connection 34 leading to the rear wheel brakes of the automotive vehicle. In order that a vacuum can never be drawn within the output hydraulic cylinder chamber 14, small holes 36 are provided in the inner flange of the spool-shaped piston 12 to communicate fluid under atmospheric pressure to the rear side of the lips of the cup-shaped packing 24. Upon a retraction of the piston 12, fluid can be sucked through the openings 36 and around the outside of the packing 24 to the chamber 14 should a vacuum develop therein. A thin disc 38 is placed over the holes 36 to prevent pressure from extruding the rubber packing 24 through the openings 36. Fluid under atmospheric pressure is communicated to the rear side of the seal 24 at all times by means of a port 40; and leakage out of the bore 14 is prevented by means of a seal 42 that is positioned on the outer end of the piston 12 so as to never move past the port 40.

The air motor 20 of the hydraulic pressure modifying unit D is formed by means of an annular steel shell 44 which is sealingly clamped between the cast housing 46 of the hydraulic cylinder 14 and the cast housing 48 of the input hydraulic chamber 50 in which the input piston 10 is located. The piston 22 of the air motor is of conventional construction and is threadedly attached to an extension of the piston 10 which passes through the air motor 20 and bears against the output piston 12. The inner connecting piston structure shown is biased into its retracted position shown in the drawing, by means of a coil spring 52. Fluid pressure from the master cylinder B is communicated to the input hydraulic chamber 50 through the inlet connection 54, and a suitable seal 56 is provided on the piston 10 to prevent leakage into the air motor 20. Inlet connections 58 and 60 are provided for the power chambers on opposite sides of the power piston 22. When the unit D is connected as shown in FIGURE 1 of the drawings, inlet connection 58 is connected to receive the control pressure from the servomotor A and the opposite inlet connection 60 is communicated to the atmosphere.

The fluid pressure servomotor A and master cylinder B shown in FIGURE 1 are generally of the type shown and described in the Earl R. Price Patent No. 2,818,710 and for a complete understanding of its construction and operation, reference may be had to that patent. In general, atmospheric pressure is communicated to opposite sides of its power piston 62 in the normal retracted position shown in the drawing; and when the foot pedal lever 64 is depressed to actuate the unit, vacuum from a reservoir 66 is communicated to the chamber 68 in the inner side of the power piston 62 to force the displacement piston 70 into the master cylinder B and thereby force fluid out of its outlet connection 72 to the pistons 10 and 10' respectively. Reservoir 66 is normally supplied with vacuum from the manifold 74 of the vehicle's propelling engine through a check valve 76 which maintains the reservoir 66 at a high vacuum level.

The power piston 62 contains suitable control valve structure actuated by the pedal lever 64 for causing a decreasing pressure within the chamber 68 as increasing force is applied to the pedal 64. This decreasing pressure is communicated through conduit 78 to the connection 60' of the modifying unit C, while atmospheric pressure is communicated to the inlet connection 58' of the unit C. Control vacuum from the conduit 78 is at the same time communicated to the inlet 58 of the pressure modifying unit D, while atmospheric pressure is communicated to its inlet connection 60. In the operation of the unit shown in FIGURE 1 therefore, the decreasing control pressure within the chamber 68 causes a proportionally increasing force to be applied to the output piston 12' of the unit C to increase the hydraulic pressure on the front wheel brakes, while a proportionately increasing force is applied to the piston 10 of the pressure modifying unit D to decrease the hydraulic pressure which it delivers to the rear wheel brakes. Upon a reduction in force applied upon the foot pedal lever 64, the control valve structure within the power piston 62 of the servomotor A bleeds air pressure to its inner power chamber 68 and hence through the conduit 78 to the connection 60' of the unit C and the connection 58 of the unit D. Hydraulic output pressure from the master cylinder D is therefore reduced. Simultaneously therewith, the increasing control pressure from the chamber 68 decreases the differential pressure across the air piston 22' to further reduce the pressure delivered to the front wheel brakes while, the decreasing differential pressure across the air piston 22 reduces the "bucking off" force that is applied to the rear brakes of the vehicle. While the system shown in FIGURE 1 is capable of various modifications, both as to proportions and as to the addition of valving structures in the air lines, the system as shown will produce varying pressures to the front and rear wheel brakes.

Figure 2:
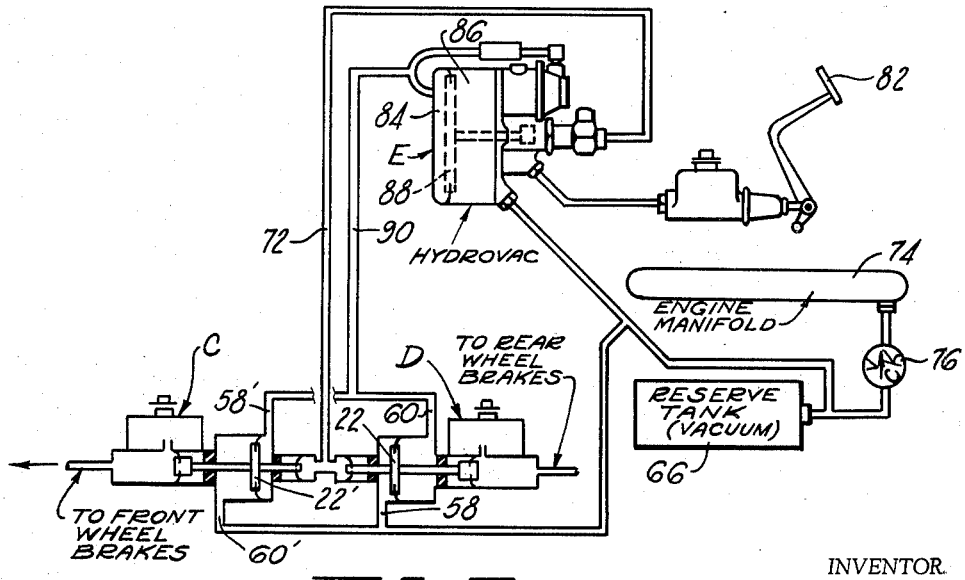
FIGURE 2 is a schematic view of an automotive braking system embodying principles of the present invention, and in which its actuating servomotor is vacuum suspended.

The braking system shown in FIGURE 2 is generally similar to that shown in FIGURE 1 in that it employs similar pressure modifying units C and D; but differs principally therefrom in that the servomotor unit E used to supply hydraulic pressure to the units C and D is of the vacuum suspended type. The servomotor unit E shown in FIGURE 2 of the drawings is of the type shown and described in the Gunther Pfeifer Patent No. 2,867,090 and is basically a pressure intensifying unit which proportionately increases a hydraulic input pressure which is received from a conventional master cylinder F. Basically the units C and F develop a hydraulic pressure in the conduit 90 which is proportional to the force applied to its foot pedal lever 82 to produce a result comparable to the units A and B shown in FIGURE 1. Those portions of FIGURE 2 which are identical to portions shown in FIGURE 1 will be designated by a like reference numeral.

The system shown in FIGURE 2 differs from that shown in FIGURE 1 principally in that the power chambers 84 and 86 on opposite sides of the power piston 88 of the servomotor unit E are normally supplied with vacuum of equal intensity during the unactuated condition of the system, and a gradually increasing pressure is supplied to the power chamber 84 as the foot pedal 82 is actuated. Manifold vacuum is supplied to the inlet 60' and 58 of the units C and D respectively, while control vacuum from the unit E is supplied to the inlets 58' and 60 of the units C and D respectively so that vacuum of the same intensity normally exists across the air pistons 22' and 22 of the units C and D. During actuation of the system, therefore, a build-up in differential pressure is developed across the power piston 22 which increases the hydraulic pressure to the front wheel brakes and which decreases the hydraulic pressure which is delivered to its rear wheel brakes.

While the invention has been described in considerable detail, I do not wish to be limited to the particular embodiments shown and described, and it is my intention to cover hereby all novel adaptations, modifications and arrangements thereof which come within the practice of those skilled in the art to which the invention relates.

I claim:
1. In a vehicle braking system and the like:
   a brake structure for a front wheel of the vehicle;
   a brake structure for a rear wheel of the vehicle;
   a means for developing hydraulic fluid pressure, said means including a first hydraulic fluid displacement means operatively connected to a first fluid pressure motor that is adapted to be controlled by the operator of the vehicle;
   a second hydraulic fluid displacement means operatively arranged between said first hydraulic fluid displacement means and one of said brake structures, said second hydraulic fluid displacement means operatively connected to,
   a second fluid pressure motor operatively connected to said first fluid pressure motor such that an increase in control pressure in said first fluid pressure motor will effect a pressure in said second fluid pressure motor to oppose increasing brake pressure to said one of said brake structures.
2. In a vehicle braking system and the like according to claim 1 and further comprising:
   a third hydraulic fluid displacement means operatively arranged between said first hydraulic fluid displacement means and the other of said brake structure, said third hydraulic fluid displacement means operatively connected to a third fluid pressure motor operatively connected to said first fluid pressure motor such that an increase in control pressure in said first fluid pressure motor will boost the hydraulic pressure to said other brake structure.
3. A fluid pressure proportioning system comprising:
   an operator controlled servomotor having a means to develop a hydraulic pressure, said servomotor being adapted to be controlled by a fluid pressure;
   a first slave servomotor having a first chamber with with a piston therein, which first chamber is adapted to receive the hydraulic pressure of said means to develop a hydraulic pressure, a force transmitting means connected to said piston, a second chamber arranged to receive the fluid pressure controlling said operator controlled servomotor with a pressure responsive means in said second chamber connected to said force transmitting means such that the fluid pressure controlling said operator controlled servomotor is biased against the hydraulic pressure developed by said operator;
   a third chamber with a movable wall therein connected to said force transmitting means such that the third chamber will develop a hydraulic pressure whose magnitude is set by a differential between the hydraulic pressure of said operator controlled servomotor and the fluid pressure controlling said operator controlled servomotor.
4. A fluid pressure proportioning system according to claim 3 and further comprising a second slave servomotor between said first slave servomotor and said second actuator including:
   a first chamber with a piston therein connected to a conduit delivering the hydraulic pressure of said means to develop a hydraulic pressure to said first slave servomotor,
   a force transmitting means connected to said piston,
   a second chamber having a pressure responsive means therein which is connected to said force transmitting means,
   conduit means for delivering the controlling fluid pressure to said second chamber to boost effect of the hydraulic pressure on said piston in said first chamber; said
   a third chamber with a movable wall therein connected to said force transmitting means such that said third chamber will develop a hydraulic pressure whose magnitude is boosted by adding said control pressure and said hydraulic pressure in the respective second and first chambers whereby pressure is increased for said second actuator as it is decreased for said first actuator.
5. A fluid pressure proportioning system according to claim 3 and further comprising a fluid reservoir operatively connected to said third chamber to replenish hydraulic fluid therein when needed.
6. A fluid pressure proportioning system according to claim 4 and further comprising first and second fluid reservoirs operatively connected to said third chambers of respective first and second slave servomotors to replenish hydraulic fluid therein when needed.

References Cited by the Examiner

UNITED STATES PATENTS

| | | | |
|---|---|---|---|
| 2,132,914 | 10/38 | Fitch | 188—181 |
| 2,283,713 | 5/42 | Wolf | 188—152 |
| 2,835,271 | 5/58 | Oberthur | 188—152 |
| 2,868,338 | 1/59 | Lucien et al. | 188—181 |
| 3,038,761 | 6/62 | Kenrick | 303—6 |

EUGENE G. BOTZ, *Primary Examiner.*

ARTHUR L. LA POINT, *Examiner.*